United States Patent
Lawson

Patent Number: 5,521,352
Date of Patent: May 28, 1996

[54] LASER CUTTING APPARATUS

[75] Inventor: William E. Lawson, Somerset, Wis.

[73] Assignee: Laser Machining, Inc., Somerset, Wis.

[21] Appl. No.: 125,922

[22] Filed: Sep. 23, 1993

[51] Int. Cl.$^6$ .................................................. B23K 26/00
[52] U.S. Cl. .................. 219/121.67; 219/121.72; 219/121.77; 219/121.85
[58] Field of Search ........................ 219/121.77, 121.74, 219/121.75, 121.67, 121.72, 121.85

[56] References Cited

U.S. PATENT DOCUMENTS

| | | | |
|---|---|---|---|
| 3,619,069 | 11/1971 | Alexander | 356/138 |
| 4,146,380 | 3/1979 | Cafarella et al. | |
| 4,491,463 | 1/1985 | Weinstein et al. | 65/2 |
| 4,623,776 | 11/1986 | Buchroeder et al. | 219/121.67 |
| 4,642,439 | 2/1987 | Miller et al. | 219/121.72 |
| 4,659,900 | 4/1987 | Gilli et al. | 219/121 LG |
| 4,751,356 | 6/1988 | La Rocca et al. | 219/121 |
| 4,761,534 | 8/1988 | Foulkes | 219/121.8 |
| 4,761,535 | 8/1988 | Lawson | 219/121.68 |
| 4,794,231 | 12/1988 | Banas et al. | |
| 4,931,616 | 6/1990 | Usui et al. | |
| 5,206,504 | 4/1993 | Sridharan | 250/251 |

OTHER PUBLICATIONS

Sasnett, M. W. et al. "Beam Characterization and Measurement of Propagation Attributes", Reprinted from Laser Beam Diagnostics, Society of Photo–Optical Instrumentation Engineers, vol. 1414, pp. 21–32, (Jan. 21–22, 1991).
"Lasers Solve Wire–Stripping Problems", Industrial Laser Review, Apr. 1991, pp. 11, 12 and 14.

*Primary Examiner*—Mark H. Paschall
*Attorney, Agent, or Firm*—Kinney & Lange

[57] ABSTRACT

An apparatus for cutting a material having a thickness, T, defined by the distance between a first surface and a second surface of the material. The apparatus comprises an energy source for providing a beam of energy, and directing mirrors for directing the beam of energy from the energy source to a first focal point between the first and second surfaces of the material, and to a second focal point between the first and second surfaces of the material. The first and second focal points are spaced apart from each other by a distance sufficient to cut through the entire thickness of the material.

12 Claims, 1 Drawing Sheet

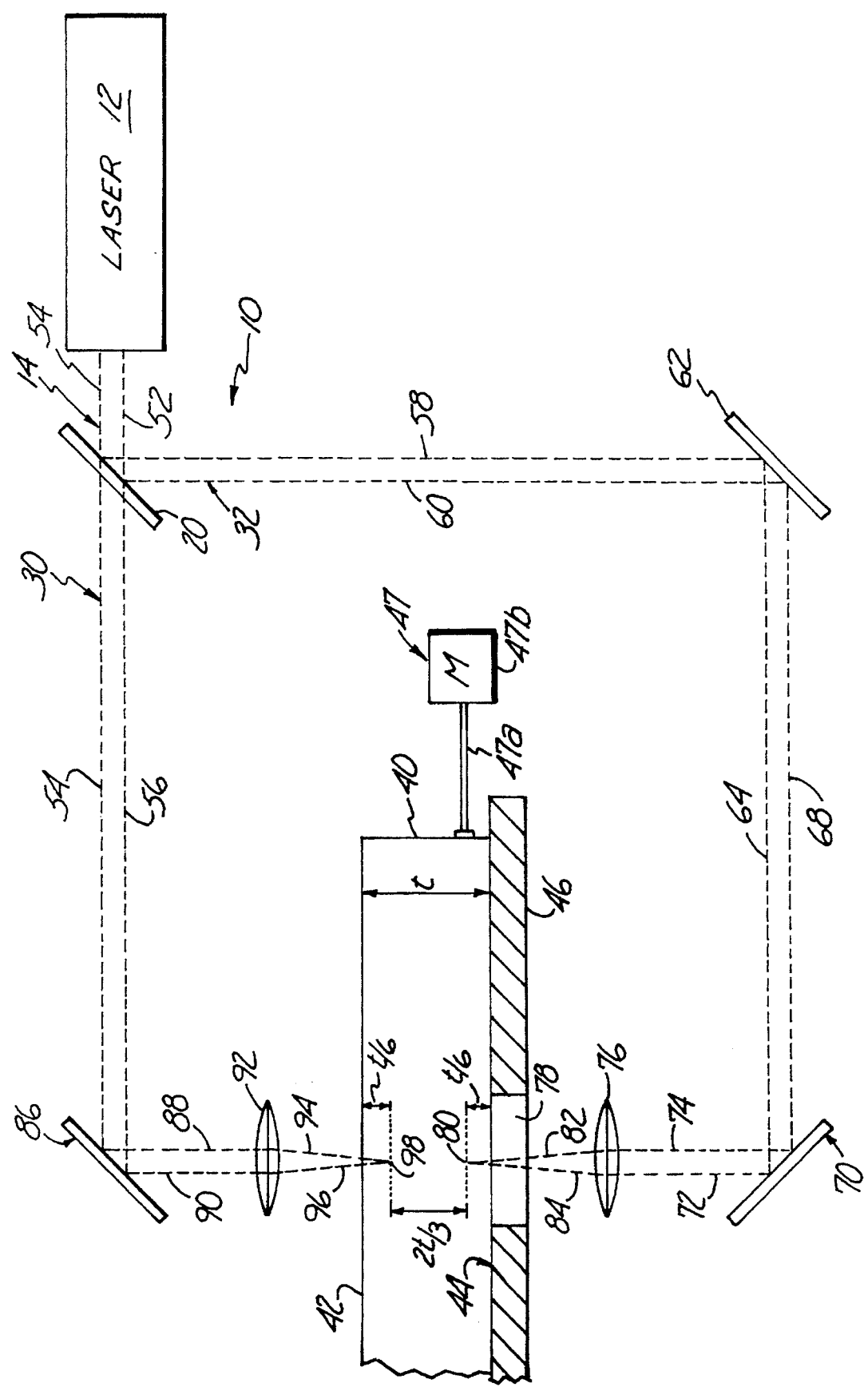

LASER CUTTING APPARATUS

BACKGROUND OF THE INVENTION

The present invention relates to a cutting apparatus, and more particularly, to a laser cutting apparatus which focuses multiple laser beams on a material to be cut.

Today laser cutting apparatuses and methods for cutting thick materials, such as wood having a thickness greater than one inch or plastic having a thickness greater than two inches, generally involve the use a single high-powered laser which produces a single beam of energy which is directed at the material. The use of a high powered lasers necessitates the use of a long focal length lens which produces a large, undefined focal point on the material, and consequently a wider kerf. The large focal point and wide kerf result in a greater amount of material being vaporized and therefore a slower cut. For some material, such as two inch plexiglass, the cut is almost impossible using a single, conventional laser beam.

Multiple laser beams have been used in a cutting applications, as exemplified by U.S. Pat. No. 4,761,535 to Lawson. Lawson relates to a laser wire stripper which uses a single laser which is directed and focused to a first point, and then directed to a curved reflector where it is refocused to a second point that is displaced from the first point by an amount which permits the insertion of a stripable wire between the two points. The beams cut the wire insulation from alternate sides while the wire is being moved along a line between the two points.

Lawson also discloses a wire cutter apparatus using a single laser which is split into opposing beams by a beam splitter. The opposing beams are directed to opposing sides of the wire and focused at the center of the wire for cutting the insulation from the wire, but not the wire itself. Lawson indicates that the focal points may be moved apart from one another.

SUMMARY OF THE INVENTION

The present invention relates to an apparatus for cutting a material having a thickness, T, defined by the distance between a first surface and a second surface of the material. The apparatus comprises energy source means for providing a beam of energy, and directing means for directing the beam of energy from the energy source means to a first focal point between the first and second surfaces of the material, and to a second focal point between the first and second surfaces of the material. The first and second focal points are spaced apart from each other by a distance sufficient to cut through the entire thickness of the material. Preferably, the first and second focal points are spaced apart from each other by a distance equal to two-thirds of the thickness of the material, the first focal point is spaced apart from the first surface by a distance equal to one-sixth of the thickness of the material, and the second focal point is spaced apart from the second surface by a distance equal to one-sixth of the thickness of the material.

BRIEF DESCRIPTION OF THE DRAWING

The sole FIGURE is an elevational view of a laser cutter according to the present invention and a cross section of a material to be cut.

DETAILED DESCRIPTION OF THE PREFERRED EMBODIMENTS

Referring to the FIGURE, a cutting apparatus 10 includes a single, fixed energy source 12, for providing a single beam 14 of energy, a beam splitter 20 for splitting the single beam 14 of energy into a first beam 30 and a second beam 32, and optics for reflecting and focusing the beams 30 and 32 to points within the material 40. The material 40 has a top surface 42, a bottom surface 44, and a thickness, t, defined as by the distance between the top surface 42 and the bottom surface 44. The material 40 is supported on a table 46. The material 40 is moved relative to the focused energy beams 30 and 32 to produce a cut by a motive mechanism 47 including a solenoid 47a having a drive pin 47b for moving the material 40 relative to the table 62. However, it is to be understood that the beams 30 and 32 may be moved relative to a stationary material 40.

A preferred energy source, a $CO_2$ laser 6, is shown projecting the single beam 14 of energy along a path shown by lines 50 and 52. Other energy sources, such as lasers which produce ultra-violet or infrared energy may be used depending on the characteristics of material 40. The beam splitter 20 is a partially silvered mirror which divides the single beam 14 into the first beam 30 which is projected along a path shown by lines 54 and 56, and into the second beam 32 which is projected along a path shown by lines 58 and 60. The angle of incidence of the single beam 14 on the beam splitter 20 is directly proportional to the amount of energy in the first and second beams 30 and 32. Preferably, the first and second beams 30 and 32, are of equal power, equal to one-half the power of the single beam 14. Additional energy sources 12 may be employed to obviate the use of the beam splitter 20, each of which contains a portion of the power of the single beam 14. This may provide advantages as the beam quality and focusability is better for smaller lasers.

The energy beam 32 projected along the path shown by lines 58 and 60 is reflected by a 100% reflective mirror 62 and continues along a path shown by lines 64 and 68. The energy beam 32 is further reflected by a 100% reflective mirror 70 along a path shown by lines 72 and 74 to a lens 76 which focuses the energy through hole 78 in the table 46, to a focal point 80 shown as the intersection of lines 82 and 84. The focal point 80 is located below the bottom surface 44 of the material 40 and within the material 40. The perpendicular distance between focal point 80 and bottom surface 44 is approximately equal to one-sixth of the total thickness t of the material 40.

The energy beam 30 projected along the path shown by lines 54 and 56, is reflected by a 100% reflective mirror 86 to a path shown by lines 88 and 90. The energy beam 30 is subsequently focused by lens 92 along lines 94 and 96 to focal point 98 below the top surface 42 of material 40, which is geometrically homologous to local point 80 below the bottom surface 44 and within material 40. The perpendicular distance from focal point 98 to the top surface 42 is approximately equal to one-sixth of the total thickness t of the material 40. Consequently, focal point 80 is located a distance approximately two-thirds of the thickness t from focal point 98. Although the preferred embodiment uses a spacing distance between foci 80 and 98 of two thirds the total thickness t of the material 40, with each focal point being located a perpendicular distance below its respective surface equal to one-sixth the total thickness t of the material 40, the location of the foci 80 and 98 and their distances from each other and from the top and bottom surfaces 42 and 44 may be changed in consideration of energy distribution requirements, characteristics of the material 40, or other factors relating to the speed, thickness, or kerf of the desired cut. For most materials, the perpendicular distance between foci 80 and 98 and the top and bottom surfaces 42 and 44 is between one-sixth and one-quarter the thickness t of the material 40, and the perpendicular distance between foci 80 and 98 is between two-thirds and one-half the thickness t of the material 40.

The energy focused at points 80 and 98 vaporizes the material 40 between the top and bottom surfaces 42 and 44 and along a kerf line defined by focal points 80 and 98, to produce a continuous cut completely through the material 40. The motive mechanism 47 including a screw 47a attached to the material 40 and motor 47b for driving the screw 47a move material 40 through the energy beams 30 and 32 focused at points 80 and 98. However, any relative motion between the material 40 and the energy beams 30 and 32 will propagate this cut along a path defined by the relative motion.

Using lower powered beams 30 and 32 (compared to the power of the single beam 14) and two lenses 76 and 92 on opposite sides of the material, permits the energy beams 30 and 32 to be focused more narrowly than if a single high-powered laser beam was used. For example, two lasers each with 3 kw of power, focus much better than a single 6 kw laser due to a lower times diffraction-limit number, $M^2$. This results in less material being vaporized, a narrower kerf and consequently, a faster cut. Thus, with opposing laser beams 30 and 32 cutting at separated foci, it becomes possible to cut the same size sample more quickly then with a single laser beam using a longer focal length lens. It further becomes possible to cut samples which are too thick to be cut at all with a single beam. Workers skilled in the art will recognize that additional energy beams and/or splitters may be employed to focus additional laser beams in the cutting plane for cutting the material 40.

Although the present invention has been described with reference to preferred embodiments, workers skilled in the art will recognize that changes may be made in form and detail without departing from the spirit and scope of the invention.

What is claimed is:

1. A method of cutting a material having a thickness of at least one inch, the method comprising:

directing a first beam of laser energy towards a first surface on the material to be cut:

directing a second beam of laser energy towards a second surface on the material to be cut;

focusing the first beam of laser energy to a first focal point within the material between the first and second surfaces at a depth equal to approximately one-sixth of the thickness of the material from the first surface; and focusing the second beam of laser energy to a second focal point within the material between the first and second surfaces at a depth equal to approximately one-sixth of the thickness of the material from the second surface; whereby a cut is made completely through the material.

2. The method of claim 1 further comprising the step of moving the material with respect to the first and second beams of energy.

3. The method of claim 1 a laser, which provides the first and second beams of energy.

4. The method according to claim 3 wherein the laser produces infrared energy.

5. The method of claim 4 wherein the laser is a $CO_2$ laser.

6. The method according to claim 3 wherein the laser produces ultraviolet energy.

7. A method of cutting a material having a thickness of at least one inch, the method comprising:

directing a first beam of laser energy towards a first surface on the material to be cut;

directing a second beam of laser energy towards a second surface on the material to be cut;

focusing the first beam of laser energy to a first focal point within the material between the first and second surfaces; and focusing the second beam of laser energy to a second focal point within the material between the first and second surfaces; the first and second focal points being spaced apart from each other a distance equal to approximately two-thirds of the thickness of the material; whereby a cut is made completely through the material.

8. The method of claim 7, further comprising the step of moving the material with respect to the first and second beams of energy.

9. The method of claim 7, further comprising the step of providing a beam splitter to separate an incident beam of laser energy that provides the first and the second laser beams of energy.

10. The method of claim 9, further comprising the step of providing an infrared laser.

11. The method of claim 9, further comprising the step of providing an infrared $CO_2$ laser.

12. The method of claim 9, further comprising the step of producing an ultraviolet energy laser.

\* \* \* \* \*

UNITED STATES PATENT AND TRADEMARK OFFICE
CERTIFICATE OF CORRECTION

PATENT NO. : 5,521,352
DATED : May 28, 1996
INVENTOR(S) : WILLIAM E. LAWSON

It is certified that error appears in the above-indentified patent and that said Letters Patent is hereby corrected as shown below:

Col. 2, line 55, before "point", delete "local", insert --focal--

Signed and Sealed this

Tenth Day of September, 1996

Attest:

BRUCE LEHMAN

*Attesting Officer*     *Commissioner of Patents and Trademarks*